(12) United States Patent
Gandhi et al.

(10) Patent No.: US 10,037,531 B2
(45) Date of Patent: *Jul. 31, 2018

(54) IDENTITY VERIFICATION AND AUTHENTICATION

(71) Applicant: Facebook, Inc., Menlo Park, CA (US)

(72) Inventors: Shaheen Ashok Gandhi, Seattle, WA (US); Matthew Nicholas Papakipos, Portola Valley, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/396,903

(22) Filed: Jan. 3, 2017

(65) Prior Publication Data

US 2017/0116610 A1 Apr. 27, 2017

Related U.S. Application Data

(63) Continuation of application No. 15/041,906, filed on Feb. 11, 2016, now Pat. No. 9,595,057, which is a continuation of application No. 14/587,688, filed on Dec. 31, 2014, now Pat. No. 9,294,465, which is a continuation of application No. 13/290,585, filed on Nov. 7, 2011, now Pat. No. 8,966,602.

(51) Int. Cl.
*G06F 7/04* (2006.01)
*G06Q 20/40* (2012.01)
*H04L 29/06* (2006.01)
*G06Q 50/00* (2012.01)
*G06Q 30/06* (2012.01)

(52) U.S. Cl.
CPC ..... *G06Q 20/4014* (2013.01); *G06Q 30/0609* (2013.01); *G06Q 30/0619* (2013.01); *G06Q 50/01* (2013.01); *H04L 63/0853* (2013.01); *H04L 63/0869* (2013.01)

(58) Field of Classification Search
CPC ........... G06Q 30/0609; G06Q 30/0619; G06Q 50/01; G06F 21/34; G06F 21/45; G06F 21/46; G06F 2221/211; H04L 9/3215; H04L 63/0428; H04L 63/08; H04L 9/3271
USPC .......................................................... 726/7
See application file for complete search history.

(56) References Cited

U.S. PATENT DOCUMENTS

| 8,285,648 B2 | 10/2012 | Goodin | |
|---|---|---|---|
| 2006/0161435 A1* | 7/2006 | Atef | G06F 21/31 704/246 |
| 2008/0177638 A1* | 7/2008 | Butler | G06F 8/38 705/26.41 |

(Continued)

*Primary Examiner* — Mohammad W Reza
(74) *Attorney, Agent, or Firm* — Baker Botts L.L.P.

(57) ABSTRACT

In one embodiment, receiving, at a first computing device associated with a social-networking system and from a second computing device, a first request to verify an identity of a user of the social-networking system; sending, by the first computing device and to a mobile device associated with the user, a second request for information about the user; receiving, at the first computing device and from the mobile device, the information about the user; determining, by the first computing device, a confidence score indicating a probability that the identity of the user is true based on the information about the user received from the mobile device and information available to the social-networking system; and sending, by the first computing device and to the second computing device, the confidence score.

20 Claims, 4 Drawing Sheets

(56) References Cited

U.S. PATENT DOCUMENTS

| | | |
|---|---|---|
| 2010/0146263 A1 | 6/2010 | Das et al. |
| 2011/0113101 A1 | 5/2011 | Ye et al. |
| 2012/0084391 A1 | 4/2012 | Patel et al. |
| 2012/0265688 A1* | 10/2012 | Dinan .................. G06Q 20/32 705/71 |
| 2013/0040654 A1 | 2/2013 | Parish |

* cited by examiner

IDENTITY VERIFICATION AND AUTHENTICATION

PRIORITY

This application is a continuation of pending U.S. patent application Ser. No. 15/041,906 filed on 11 Feb. 2016, which is a continuation of U.S. patent application Ser. No. 14/587,688 filed on 31 Dec. 2014 and issued as U.S. Pat. No. 9,294,465 on Mar. 22, 2016, which is a continuation of U.S. patent application Ser. No. 13/290,585, filed on 7 Nov. 2011, and issued as U.S. Pat. No. 8,966,602 on 24 Feb. 2015.

TECHNICAL FIELD

This disclosure generally relates to identity verification and authentication.

BACKGROUND

There are many situations where a party's true identity needs to be verified and authenticated. A typical example of such a situation is during a financial transaction, such as when one party, the buyer, is purchasing some merchandise from another party, the seller. When the buyer wishes to pay for the merchandise with a credit card, the seller may wish to verify that the buyer's true identity matches the name on the credit card before making a charge on the credit card. On the other hand, before giving the seller his credit card or credit card number to pay for the merchandise, the buyer may also wish to verify the seller's true identity, especially when the purchase is made remotely, such as over the telephone or on the Internet. As another example, when two people meet for the first time, such as at a social function, and introduce themselves to each other, each person may wish to verify the other person's identity to ensure that the other person is indeed who he says he is before further developing a social relationship with the other person and perhaps divulging personal information to the other person.

DESCRIPTION OF EXAMPLE EMBODIMENTS

Figure 1:
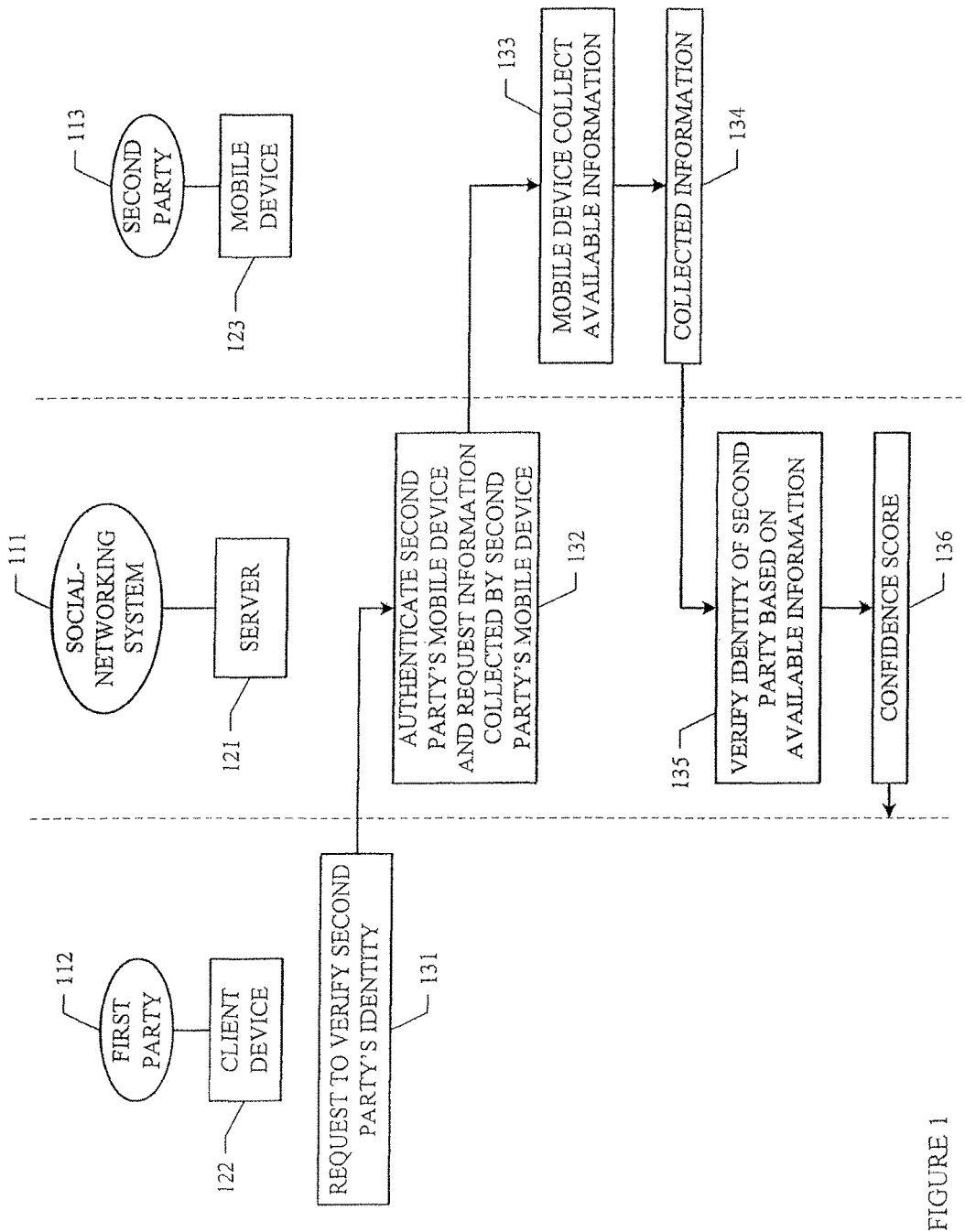
FIG. 1 illustrates an example method for verifying and authenticating a party's identity.

In particular embodiments, a party's identity is verified and authenticated based on various types of available information. In particular embodiments, the available information is associated with a social-networking system, such as stored with or provided to the social-networking system. The party may be a user of the social-networking system or may be affiliated or associated with the social-networking system. The available information may include, for example and without limitation, the party's mobile device (e.g., a mobile telephone linked to or authenticated by the social-networking system), the party's access or login identifier (ID) and password with the social-networking system, the party's social connections within the social-networking system, the party's activities (e.g., check-ins, posts, messages, etc.) logged with the social-networking system, the party's current location, and the party's biometric data (e.g., finger print, voice, facial features, etc.). Any and all available information, when appropriate, may be used to verify and authenticate the party's identity.

In particular embodiments, a social-networking system verifies and authenticates a party's identity when needed (e.g., upon receiving a request for such an identity verification and authentication). The social-networking system may verify and authenticate the party's identity based on any and all information available to the social-networking system. In particular embodiments, the social-networking system may provide a confidence score indicating the probability that the party's claimed identity is his true identity. For example, the confidence score may be a number within a predetermined range, such as between 1 and 10, with 10 indicating the highest confidence level and 1 indicating the lowest confidence level.

A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. Such social-networking websites enable their members, who are commonly referred to as website users, to perform various social activities. For example, the social-networking website operated by Facebook, Inc. at www.facebook.com enables its users to communicate with their friends via emails, instant messages, or blog postings, organize social events, share photos, receive news of their friends or interesting events, play games, etc. In addition to its users, a social-networking system may be affiliated with various third parties (e.g., partners to the social-networking system) and enable these third parties to perform certain activities or interactions with its users. For example, a third party may supply an application to the social-networking system, and users of the social-networking system may access this application through the social-networking system.

To become a user of a social-networking system, such as the one operated by Facebook, Inc., a person needs to establish a user account with the system. The user account may be identified with a unique username or user identifier (ID), and access to the user account may be controlled with a password. To log into his user account, a user must provide the correct combination of username and password. A user of the social-networking system may access his user account with the system over a computer or communications network using a network-ready device. In particular embodiments, the network-ready device may be a mobile device, such as a mobile telephone. In some cases, the mobile device may include dedicated applications specifically designed for accessing the social-networking system so that the user may use the services provided by the social-networking system with relative ease. For example, a user may log into his user account with the social-networking system, upload images, post messages, establish social connections, and so on using the mobile device. In particular embodiments, a user may link his mobile device to his user account with the social-networking system or provide information about his mobile device to the social-networking system so that the social-networking system is aware that this particular mobile device belongs to his particular user.

FIG. 1 illustrates an example method for verifying and authenticating a party's identity. Suppose that a first party 112 wishes to verify the identity of a second party 113. In particular embodiments, a social-networking system 111 acts as an intermediary and verifies the identity of second party 113 in behalf of first party 112.

In particular embodiments, when first party 112 desires to verify the identity of second party 113, first party 112 may send a request to social-networking system 111 (as illustrated in STEP 131). First party 112 may be associated with a client device 122. The identity verification request may be sent from client device 122 to a server 121 associated with social-networking system 111 over a computer or communications network (e.g., the Internet). In particular embodiments, client device 122 may be an electronic device including hardware, software, or embedded logic components or a combination of two or more such components and capable of carrying out the appropriate functionalities implemented or supported by client device 122. For example and without limitation, client device 122 may be a desktop computer system, a notebook computer system, a netbook computer system, a handheld electronic device, or a mobile telephone. First party 112 may access a network (e.g., the Internet) using client device 122. In particular embodiments, server 121 may be a unitary server or may be a distributed server spanning multiple computers or multiple datacenters. Server 121 may include hardware, software, or embedded logic components or a combination of two or more such components for carrying out the appropriate functionalities implemented or supported by server 121. For example, server 121 may host a website associated with social-networking system 111 and users of social-networking system 111 may access services provided by social-networking system 111 through server 121.

In some implementations, the identity verification request from first party 112 to social-networking system 111 may include an identity claimed by second party 113 and ask sever 121 to verify whether this claimed identity is indeed the true identity of second party 113. For example, if second party 113 claims that his name is "John Smith", the identity verification request may include this name and ask sever 121 to verify whether the real name of second party 113 is in fact "John Smith".

In particular embodiments, second party 113 is a user of social-networking system 111 and is associated with a mobile device 123, such as a mobile telephone. In this case, the identity verification request from first party 112 to social-networking system 111 may optionally further include an identifier of mobile device 123, such as its telephone number or device serial number. Server 121 may use this information to communicate with mobile device 123.

Upon receiving the identity verification request from first party 112, server 121 may contact mobile device 123 to authenticate mobile device 123 and request various types of information collected by mobile device 123 (as illustrated in STEP 132). In particular embodiments, mobile device 123 may support functionalities specifically designed to work with social-networking system 111. In some implementations, mobile device 123 may support certain authentication mechanism that enables server 121 to authenticate it as a device known to social-networking system 111 and thus trusted by social-networking system 111. Different authentication mechanisms may be employed and this disclosure contemplates any applicable authentication mechanism. For example, server 121 may authenticate mobile device 123 through a challenge-response process. In this case, server 121 sends a challenge question to mobile device 123, and mobile device 123 must respond with the correct answer to the challenge question before it can be authenticated and considered trustworthy. In some implementations, the response to the challenge is a cryptographically computed response based on either symmetric (e.g., the cryptographic salt) or asymmetric cryptography. For example, upon receiving a challenge from server 121, mobile device 123 cryptographically computes a response and sends this computed response back to server 121. As another example, mobile device 123 may have an authentication certificate, which may be sent to server 121 upon request for authentication purpose. As a third example, there may be a secret key stored on mobile device 123, which may be used to authenticate mobile device 123 to server 121.

In particular embodiments, mobile device 123 is supplied or sponsored by social-networking system 111 so that a suitable mechanism has been implemented and put in place to enable social-networking system 111 to reliably authenticate mobile device 123 when needed. In addition, there may be applications residing and executing on mobile device 123 specifically designed to work with social-networking system 111. For example, second party 113, being a user of social-networking system 111, may log into his user account with social-networking system 111 using mobile device 123. As long as second party 113 remains logged into his user account with social-networking system 111, mobile device 123 has access to information stored in the user account, including the user ID of second party 113. Furthermore, some applications may implement functionalities that support the identity verification process, such as communicating with server 121, collecting and sending relevant information, and seeking user permission.

Once server 121 is able to authenticate mobile device 123 as a trustworthy device, server 121 may consider information received from mobile device 123 as trustworthy and reliable. Consequently, server 121 may use such information to help verify the identity of second party 113 with sufficient confidence. On the other hand, if mobile device 123 cannot be authenticated as a reliable device (e.g., mobile device 123 has failed to provide the correct response to the challenge question), sever 121 may not be able to confidently rely on the information supplied by mobile device 123. Although such information may still be taken into consideration when server 121 verifies the identity of second party 113, server 121 may need to seek and rely more on information received from other, more reliable sources (e.g., information stored with social-networking system 111).

Upon receiving the information request from server 121, in particular embodiments, mobile device 123 may optionally notify second party 113 that someone (e.g., first party 112) is attempting to verify his identity and ask second party 113 whether he permits his information to be sent to sever 121 to be used to verify his identity. This enables second party 113 to control who can verify his identity as well as when his identity can be verified. If second party 113 permits his identity to be verified, mobile device 123 may collect the available and applicable information (as illustrated in STEP 133) and send the collected information to server 121 (as illustrated in STEP 134). On the other hand, if second party 113 does not permit his identity to be verified, mobile device 123 may notify server 121 so that server 121 can notify first party 112 that second party 113 does not allow his identity to be verified at this time or by first party 112.

The specific types of information collected by mobile device 123 may vary (e.g., depending on the capabilities of mobile device 123) and this disclosure contemplates any applicable type of information. As one example, if second party 113 is currently logged into his user account with social-networking system 111 using mobile device 123, it indicates that second party 113 knows the correct combination of username and password to his user account. This in turn suggests that the identity of second party 113 should match the identity provided in his user account with social-networking system 111. In this case, the information collected by mobile device 123 and sent to server 121 may include the user ID of the account with social-networking system 111 that second party 113 is logged into.

As another example, if mobile device 123 includes a location sensor (e.g., a Global Positioning System (GPS) sensor), mobile device 123 may determine its current location, which is also the current location of second party 113 since mobile device 123 is being carried by second party 113. In this case, the information collected by mobile device 123 and sent to server 121 may include the current location of second party 113 (e.g., as represented by the GPS coordinates).

As a third example, mobile device 123 may include components (e.g., sensors) that are capable of collecting biometric information. More specifically, if mobile device 123 includes a finger print scanner, mobile device 123 may prompt second party 113 to put his thumb against the finger print scanner and take second party's 113 thumb print. If mobile device 123 includes a camera, mobile device 123 may prompt second party 113 to take a photograph of his face. If mobile device 123 includes a voice recorder, mobile device 123 may prompt second party 113 to speak a sentence and record that sentence. Furthermore, the sentence may be a predetermined sentence (e.g., similar to a pass code) specifically used for verifying second party's 113 identity. In this case, the information collected by mobile device 123 and sent to server 121 may include one or more types of biometric data (e.g., thumb print, face image, voice recording, etc.).

As a fourth example, mobile device 123 may be associated with a Bluetooth device (e.g., a Bluetooth earphone or a Bluetooth security dongle). Mobile device 123 may perform a test communication with the Bluetooth device to determine whether the Bluetooth device is within range and nearby. Since Bluetooth devices have a limited communication range, if mobile device 123 is able to communicate with its associated Bluetooth device, this suggests that both mobile device 123 and the Bluetooth device are being carried by second party 113, which in turn suggests that second party 113 is the actual owner of mobile device 123. On the other hand, if mobile device 123 is not able to communicate with its associated Bluetooth device, this suggests that the Bluetooth device is not with second party 113. Although it is possible that second party 113 is still the actual owner of mobile device 123 and has just forgotten or chosen not to carry the associated Bluetooth device with him at this time, this can also suggest that second party 113 may not be the true owner of mobile device 123 because second party 113 does not have the associated Bluetooth device with him. If mobile device 123 has been stolen, for example, it is less likely that the associated Bluetooth device has also been stolen at the same time by the same person. Thus, the thief probably only has mobile device 123 but not the associated Bluetooth device. Thus, the information collected by mobile device 123 and sent to server 121 may indicate whether mobile device 123 is able to communicate with its associated Bluetooth device.

Again, there are various types of information mobile device 123 may collect and sent to server 121 and this disclosure contemplates any applicable type of information. In some implementations, the response mobile device 123 sent to server 121 may include both the answer to the device authentication challenge received from server 121 and the collected information. Mobile device 123 may package all the data together in a communication packet and sent the packet to server 121. The following is an example packet:

| authentication challenge response |
| --- |
| GPS coordinates |
| thumb print |
| facial image |
| voice recording |
| Bluetooth signal |
| user ID with social-networking system |
| . . . |

Upon receiving the response (e.g., the communication packet) from mobile device 123, server 121 may authenticate mobile device 123 and verify the identity of second party 113 based on the information included in the response as well as other information available to server 121, such as information stored with social-networking system 111 (as illustrated STEP 135). In verifying the identity of second party 113, server 121 may take into consideration any and all available information. When needed, server 121 may request additional information, either from second party 113 and mobile device 123 or from other users of social-networking system 111. In particular embodiments, server 121 may compute a confidence score that indicates a probability that the true identity of second party 113 matches the identity claimed by second party 113. The confidence score may be a value within a predetermined range (e.g., between 1 and 10, with 10 indicating the highest confidence level and 1 indicating the lowest confidence level). Information that suggests that the true identity of second party 113 matches the identity claimed by second party 113 may help increase the confidence score, while information that suggests that the true identity of second party 113 does not match the claimed identity of second party 113 may cause the confidence score to be decreased.

As described above, in particular embodiments, once server 121 is able to authenticate mobile device 123 (e.g., a correct response to the authentication challenge question is included in the response received from mobile device 123), server 121 may consider information provided by mobile device 123 trustworthy and rely on such information to verify the identity of second party 113.

As an example, suppose that the response from mobile device 123 includes the user ID of the account with social-networking system 111 that second party 113 is logged into. Server 111 may examine the name provided with the account. If the name in the account matches with the name claimed by second party 113, this may help increase the confidence score, and vice versa. Mobile device 123 itself can be used to help verify the identity of second party 113 as well. If second party 113 has linked mobile device 123 to his account with social-networking system 111, this may suggest that mobile device 123 is currently being carried by its true owner. Information stored in connection with the user account may help verify the identity of second party 113. For example, server 121 may determine who are friends to second party 113, extract a facial image of second party 113 from photographs uploaded to the user account, determine locations recently (e.g., within the past 24 hours) visited by second party 113 from his "check-ins", and mine keywords from messages posted by second party 113. All such information may help verify the identity of second party 113.

As another example, suppose that the response from mobile device 123 includes the current location (e.g., GPS coordinates) of mobile device 123. Server 111 may examine this current location with the information available to social-networking system 111. Suppose that the information available to social-networking system 111 indicates that second party 113 lives and works in Northern California, and the current location of mobile device 123 is in San Francisco, this may help increase the confidence score. On the other hand, if the current location of mobile device 123 is somewhere in Nigeria, this may cause the confidence score to decrease, especially if there is no indication, based on all available information, that second party 113 is currently traveling in that country. In addition, suppose that second party 113 has performed a check-in to social-networking system 111 at a restaurant in Oakland recently (e.g., within the past 8 hours), this further suggests that the person having mobile device 123 is not the real second party 113, as the same person cannot be on two different continents at about the same time.

In some implementations, based on the current location of mobile device 123, server 121 may determine whether there are other mobile devices associated with other users of social-networking system 111 currently at the same location. If so, there may be other users of social-networking system 111 who are currently with second party 113. These users are likely to know second party 113 personally since they are with him. In this case, server 121 may send requests to these other mobile devices and ask these other users to verify whether the person they are with is indeed second party 113. An affirmative response from such a user may help increase the confidence score. In addition, server 121 may send messages to other users of social-networking system 111 who are friends of second party 113, even if these other users are not currently with second party 113. Server 121 may ask the friends of second party 113 whether they know where second party 113 is currently located. If a friend answers with a location that matches the current location of mobile device 123, this may help increase the confidence score.

As a third example, suppose that the response from mobile device 123 includes biometric data. Sever 121 may process such data to help verify the identity of second party 113. For example, if the biometric data include a photograph of the face of second party 113, server 121 may process the photograph to perform facial recognition. Server 121 may compare the face in the photograph with other photographs uploaded to social-networking system 111, either by second party 113 himself or by other users of social-networking system 111 who are friends of second party 113. If the face in the photograph matches the face of second party 113 in the other photographs, this may help increase the confidence score. Similarly, if the biometric data include a thumb print and there is a thumb print of second party 113 on file with social-networking system 111, server 121 may compare the two thumb prints. A match may help increase the confidence score, and vice versa. If the biometric data include a voice recording, server 121 may perform voice recognition and compare the voice recording against the voice of second party 113 on file with social-networking system 111, if any. Again, a match may help increase the confidence score.

Once server 121 has computed a confidence score that indicates the confidence level of the identity of second party 113 based on any and all available information, server 121 may send this confidence score to first party 112 (as illustrated in STEP 136).

The process of verifying a party's identity as illustrated in FIG. 1 has many practical applications. A typical scenario is during a financial transaction, such as when one party, the buyer, is purchasing some merchandise from another party, the seller. For example, suppose that a user of a social-networking system is purchasing a computer from a merchant who is also affiliated with the social-networking system. The user wishes to pay for the computer with a credit card. For such a transaction, the user and the merchant may be located at the same location (e.g., the user is buying the computer in the merchant's store) or at different locations (e.g., the user is ordering the computer online or over the telephone). In either case, the social-networking system may help the two parties verify each other's identity, based on the process illustrated in FIG. 1.

Figure 2:
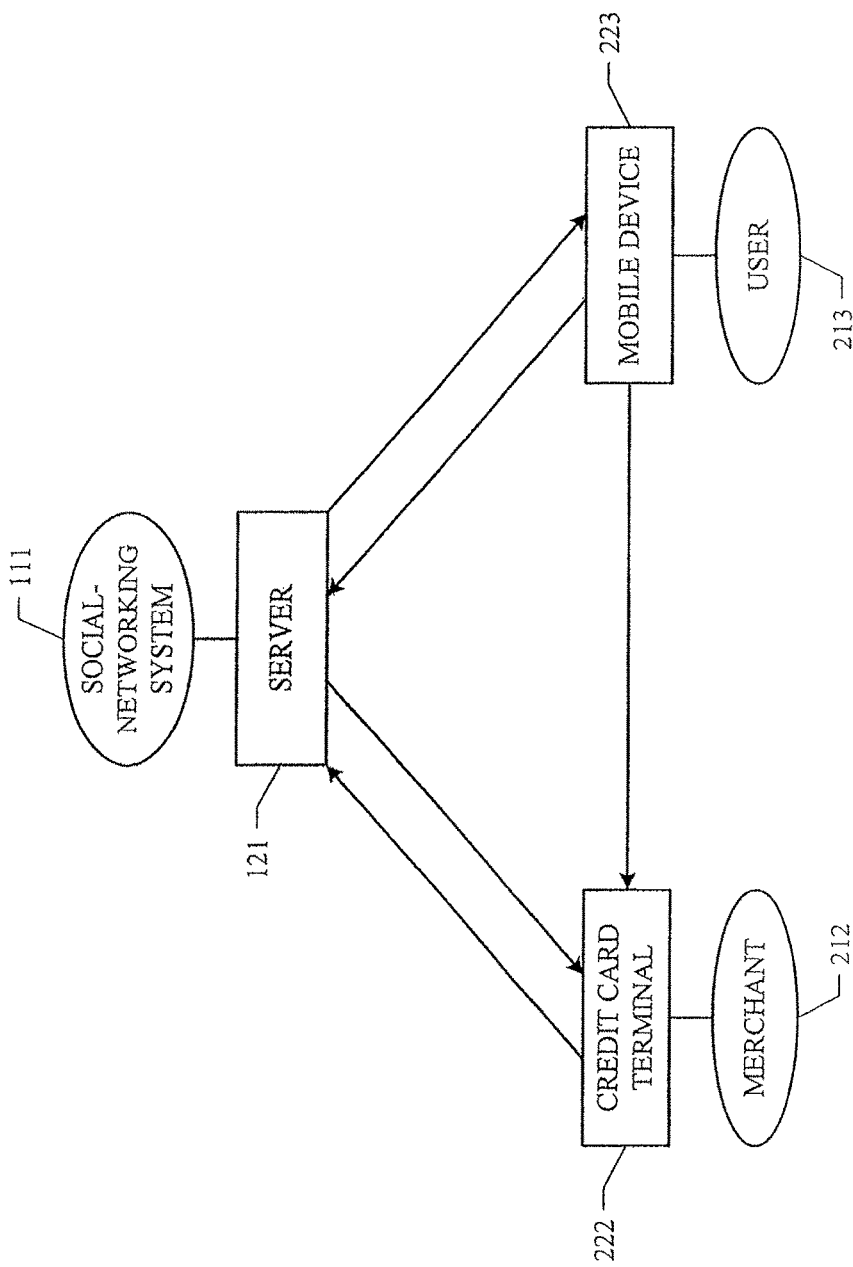
FIG. 2 illustrates an example financial transaction where the buyer and the seller are located at the same location.

FIG. 2 illustrates an example financial transaction where the buyer and the seller are located at the same location. In particular embodiments, a merchant 212 may be associated with a credit card terminal 222, which may also be a mobile device (e.g., a mobile telephone). Credit card terminal 222 is capable of charging a credit card account for a specific amount. A user 213 is associated with a mobile device 223 (e.g., a mobile telephone). When user 213 is ready to pay for the merchandise (e.g., a computer) with a credit card, mobile device 223 may initiate a communication with credit card terminal 222, which causes the identities of user 213 and merchant 212 to be verified to each other through social-networking system 111.

In some implementations, credit card terminal 222 sends an identity verification request to server 121 associated with social-networking system 111. The request may include the name of merchant 212 and the name claimed by user 213. Server 121 sends a request to mobile device 223 to authenticate mobile device 223 and request information from mobile device 223. The request may also include the name of merchant 212.

In some implementations, upon receiving the request, mobile device 223 first notifies user 213 (e.g., through a pop up window) that merchant 212 is attempting to verify his identity and ask user 213 whether he permits his identity to be verified by merchant 212. This gives user 213 the option to control who can verify his identity. Consequently, this option requires some interaction from user 213. Alternatively, in some implementations, mobile device 223 does not specifically seek permission from user 213 in order to proceed with the identity verification process. This option does not require any interaction from user 213 during the identity verification process. A user may choose which option he prefers (e.g., depending on whether he wishes to be troubled with the identity verification process).

Suppose that user 213 has granted the permission. Mobile device 223 collects the available and applicable information (e.g., as described in connection with FIG. 1) and sends the response to the authentication challenge and the collected information to server 121. Based on the information received from mobile device 223 and information available to social-networking system 111, server 121 computes a confidence score and send the score to credit card terminal 222. For example, as a part of the identity verification process, since user 213 is purchasing a computer, server 121 may ask friends of user 213 whether user 213 has discussed purchasing a computer with them recently. If so, this may help increase the confidence score. Credit card terminal 222 may decide whether to proceed with the transaction based on the confidence score received from server 121. For example, there may be a predetermined threshold score (e.g., 7). If the confidence score satisfies the threshold score, credit card terminal 222 may proceed with the transaction and charge the credit card provided by user 213. Otherwise, credit card terminal 222 may decline the credit card. In this case, merchant 212 may have the option of seeking additional identification from user 213 (e.g., asking for user's 213 driver's license or other types of identification documents).

In some implementations, if both credit card terminal 222 and mobile device 223 have Bluetooth transmitter and receiver, they may be able to exchange signals and information using the Bluetooth protocol. Since Bluetooth has a limited range, being able to communicate using Bluetooth indicates that the two devices are in close proximity to each other.

Figure 3:
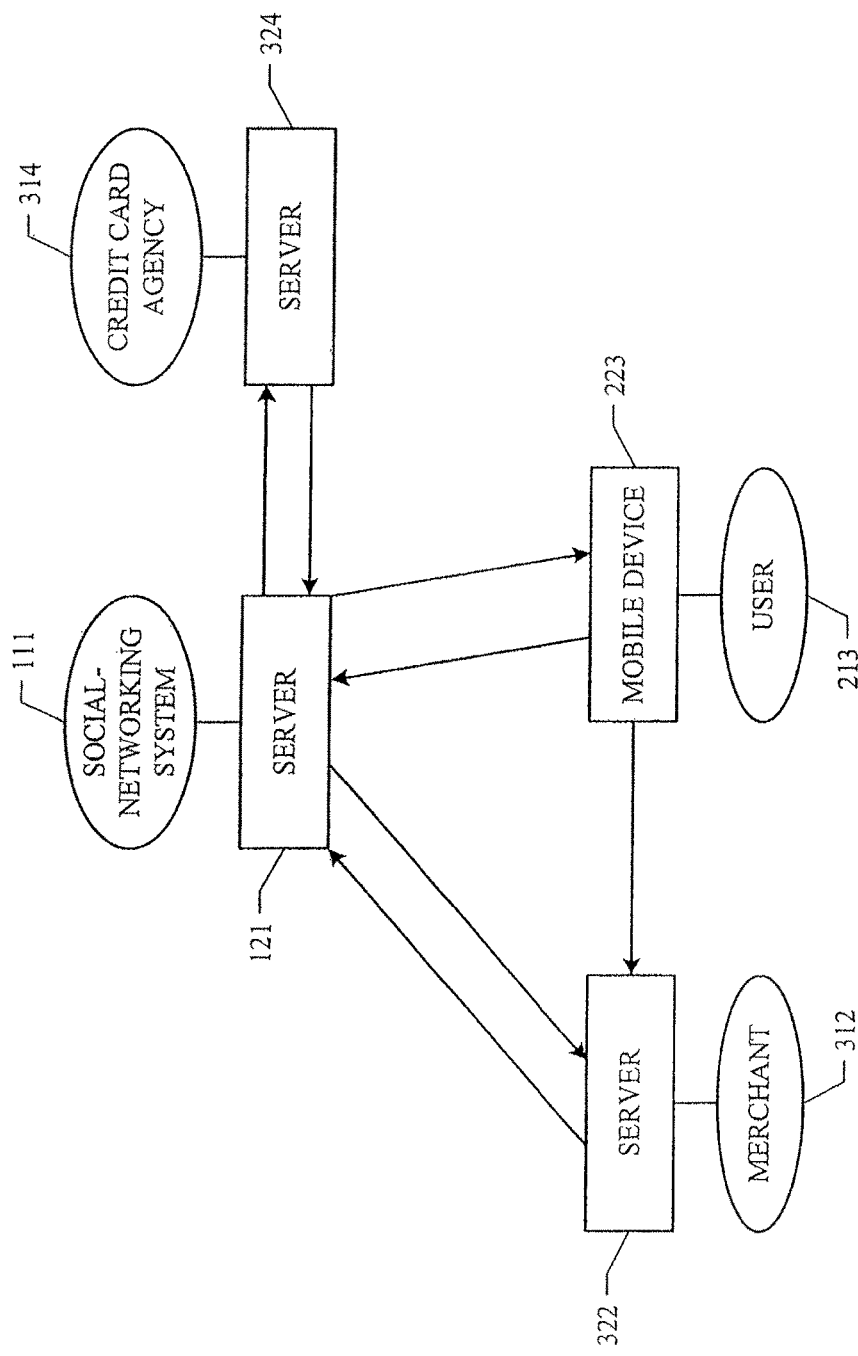
FIG. 3 illustrates an example financial transaction where the buyer and the seller are located at different locations.

FIG. 3 illustrates an example financial transaction where the buyer and the seller are located at different locations (e.g., purchase made over the telephone or the Internet). Suppose that user 213 wishes to pay for a computer purchased from a website of a merchant 312 with a credit card. While going through the checkout procedure, user 213 may provide a name and a credit card number to a server 322 hosting merchant's 312 website. Server 322 may send a request to server 121 associated with social-networking system 111. In some implementations, social-networking system 111 may provide a set of Application Programming Interfaces (API) that allow third parties affiliated with social-networking system 111 (e.g., its partners and associates) to communicate with its server 121 with relative ease. Each affiliated third party may be identified with a unique ID (e.g., a merchant ID). To make an identity verification request, server 322 associated with merchant 312 may make an API call to server 121 associated with social-networking system 111. The API call may include the ID of merchant 312 and ask server 121 to verify the identity of user 213. By providing the ID of merchant 312 in the API call, server 121 knows which third party is making the identity verification request.

Similar to FIG. 2, server 121 may contact mobile device 223 associated with user 213 in order to authenticate mobile device 223 and request relevant information from mobile device 223. Server 121 may notify mobile device 223 the name of merchant 312 so that user 213 can learn who is attempting to verify his identity. Again, mobile device 223 may optionally notify user 213 the name of merchant 312 who is attempting to verify user's 213 identity and seek permission from user 213 before sending information about user 213 to server 121. Server 121 may use the information received from mobile device 223 as well as information available to social-networking system 111 to compute a confidence score for verifying the identity of user 213 (e.g., as described in connection with FIG. 1) and send this confidence score to server 322 associated with merchant 312.

Since there is a credit card transaction involved in the purchasing process, a credit card agency 314 may be involved, who is responsible for authorizing and making the actual charge to the credit card account for a specified amount. In some implementations, server 121 may also forward the confidence score to a server 324 associated with credit card agency 314. Server 324 may decide whether to authorize and make the actual charge to the credit card account based on the confidence score. Again, there may be a predetermined threshold score (e.g., 7). If the confidence score satisfies the threshold score, server 324 may proceed with making the charge to the credit card account. Otherwise, server 324 may reject the charge.

In particular embodiments, mobile device 223 may include applications (e.g., provided by individual merchants) that enable user 213 to purchase merchandise from various merchants using mobile device 223. Each application may be identified by a unique application ID. Such an application may include a feature that verifies, either automatically or upon user request, the identity of a merchant for user 213 when user 213 is purchase merchandise from that merchant. The process of verifying the identity of a merchant is similar to the process of verifying a user (e.g., as described in connection with FIG. 1). For example, mobile device 223 may send a request to server 121 identifying the merchant whose identity is to be verified. The request may also include the ID of the application executing on mobile device 223. Server 121 may request relevant information from the merchant and compute a confidence score based on any and all available information. This confidence score is then sent to mobile device 223 and displayed to user 213. User 213 can decide whether to disclose his credit card number to the merchant based on the confidence score.

Typically, the credit card agency charges merchants a fee for each credit card transaction. The fee is usually a percentage of the amount of transaction (e.g., 4% of the total charge). When a merchant employs an identity verification process, such as the one described in connection with FIG. 1, to verify the identity of each customer before making a credit card charge, it may help decrease the amount of fraudulent credit card usage, which in turn helps save money for the credit card agency. Consequently, a merchant employing an identity verification process may be able to negotiate with the credit card agency for a lower fee because with the identity verification process, the merchant ensures, as much as possible, that only legitimate charges go through.

Another scenario where identity verification is useful may be during social settings. As an example, when two people meet at a party for the first time, they may introduce themselves to each other. If both of them are users of social-networking system 111 and carry mobile devices, they may verify each other's identity before divulging personal information to each other. As another example, often, a user of social-networking system 111 may receive a "friend request" from another user. The other user may claim his name is, for example, "John Smith". Before adding the second user as his friend, the first user may wish to verify that the second user's name is really "John Smith" or the second user is the specific "John Smith" known to the first user instead of some other "John Smith".

Figure 4:
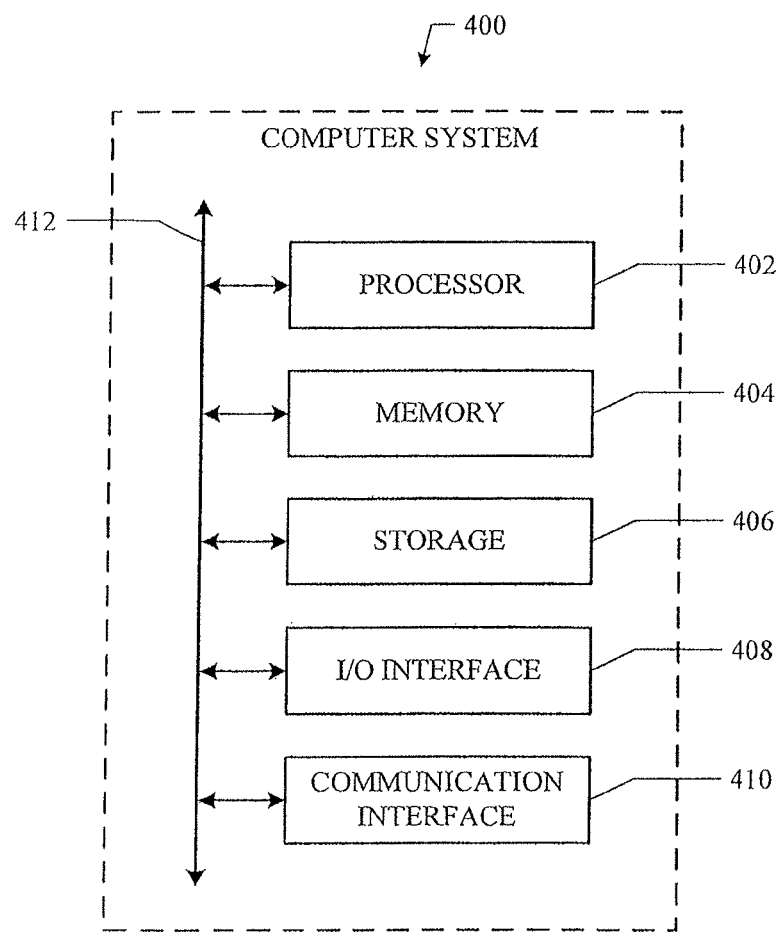
FIG. 4 illustrates an example computer system.

Particular embodiments may be implemented on one or more computer systems. FIG. 4 illustrates an example computer system 400, which may implement server 121 associated with social-networking system 111. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such as, for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 402 (such as, for example, one or more internal registers or caches), one or more portions of memory 404, one or more portions of storage 406, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
receiving, by a first computing device associated with a social-networking system from a second computing device associated with a first party of a financial transaction, a request to verify a claimed identity of a second party to the financial transaction, the social-networking system maintaining information relating to one or more social connections of the first party of the financial transaction with additional users of the social-networking system;
identifying, by the first computing device associated with the social-networking system, social connection information relating to the one or more social connections of the second party with the additional users of the social-networking system;
sending, by the first computing device to a third computing device associated with the second party, a second request for information about the second party;
receiving, at the first computing device from the third computing device, the information about the second party;
determining, by the first computing device, a confidence score indicating a confidence level of the claimed identity of the second party, based at least in part on the information received from the third computing device and information available to the social-networking system; and
sending, by the first computing device to the second computing device associated with the first party, the confidence score for verifying the claimed identity of the second party.

2. The method of claim 1, wherein the first party comprises a buyer and the second party comprises a merchant.

3. The method of claim 1, further comprising:
recognizing the third computing device as a trusted device known by the social-networking system to be associated with an account of the second party with the social-networking system, based at least in part on the information received from the third computing device.

4. The method of claim 1, wherein the first request includes a unique application identifier that identifies an application associated with the second party that is running on the second computing device, the application enabling the first party to purchase of merchandise from the second party.

5. The method of claim 1, wherein:
sending the second request for information about the second party comprises sending a challenge question to the third computing device associated with the second party; and
receiving the information about the second party comprises receiving a response to the challenge question; and
the method further comprises:
determining, by the first computing device, that the response to the challenge question is correct; and
determining, by the first computing device, the confidence score indicating the confidence level of the claimed identity of the second party based at least in part on the response to the challenge question.

6. The method of claim 1, wherein the information associated with the second party as received from the third computing device comprises at least one selected from the group consisting of:
an identifier of a user account associated with the social-networking system;
an identifier of the third computing device;
a current location of the third computing device;
an image of a face associated with the second party;
a recording of a voice associated with the second party;
a finger print associated with the second party; and
a signal from a Bluetooth device associated with the third computing device.

7. The method of claim 1, wherein the information available to the social-networking system comprises at least one selected from the group consisting of:
one or more social connections of the second party;
one or more messages posted by the second party;
one or more images uploaded by the second party; and
one or more check-ins made by the second party.

8. A first computing device associated with a social-networking system comprising:
a memory comprising instructions executable by one or more processors; and
the one or more processors coupled to the memory and operable to execute the instructions, the one or more processors being operable when executing the instructions to:
receive, from a second computing device associated with a first party to a financial transaction, a request to verify a claimed identity of a second party to the financial transaction, the social-networking system maintaining information relating to one or more social connections of the first party of the financial transaction with additional users of the social-networking system;
identify social connection information relating to the one or more social connections of the second party with the additional users of the social-networking system;
send, to a third computing device associated with the second party, a second request for information about the second party;
receive, from the third computing device, the information about the second party;
determine a confidence score indicating a confidence level of the claimed identity of the second party based at least in part on the information received from the third computing device and information available to the social-networking system; and
send, to the second computing device associated with the first party, the confidence score for verifying the claimed identity of the second party.

9. The first computing device of claim 8, wherein the first party comprises a buyer and the second party comprises a merchant.

10. The first computing device of claim 8, wherein the one or more processors are further operable when executing the instructions to:
recognize the third computing device as a trusted device known by the social-networking system to be associated with an account of the second party with the social-networking system, based at least in part on the information received from the third computing device.

11. The first computing device of claim 8, wherein the first request includes a unique application identifier that identifies an application associated with the second party that is running on the second computing device, the application enabling the first party to purchase of merchandise from the second party.

12. The first computing device of claim 8, wherein:
sending the second request for information about the second party comprises sending a challenge question to the third computing device associated with the second party; and
receiving the information about the second party comprises receiving a response to the challenge question; and
the method further comprises:
determining, by the first computing device, that the response to the challenge question is correct; and
determining, by the first computing device, the confidence score indicating the confidence level of the claimed identity of the second party based at least in part on the response to the challenge question.

13. The first computing device of claim 8, wherein the information associated with the second party as received from the third computing device comprises at least one selected from the group consisting of:
an identifier of a user account associated with the social-networking system;
an identifier of the third computing device;
a current location of the third computing device;
an image of a face associated with the second party;
a recording of a voice associated with the second party;
a finger print associated with the second party; and
a signal from a Bluetooth device associated with the third computing device.

14. The first computing device of claim 8, wherein the information available to the social-networking system comprises at least one selected from the group consisting of:
one or more social connections of the second party;
one or more messages posted by the second party;
one or more images uploaded by the second party; and
one or more check-ins made by the second party.

15. One or more computer-readable non-transitory storage media embodying software operable when executed by a first computing device associated with a social networking system to:
receive, from a second computing device associated with a first party to a financial transaction, a request to verify a claimed identity of a second party to the financial transaction, the social-networking system maintaining information relating to one or more social connections of the first party of the financial transaction with additional users of the social-networking system;
identify social connection information relating to the one or more social connections of the second party with the additional users of the social-networking system;
send, to a third computing device associated with the second party, a second request for information about the second party;
receive, from the third computing device, the information about the second party;
determine a confidence score indicating a confidence level of the claimed identity of the second party based at least in part on the information received from the third computing device and information available to the social-networking system; and
send, to the second computing device associated with the first party, the confidence score for verifying the claimed identity of the second party.

16. The media of claim 15, wherein the first party comprises a buyer and the second party comprises a merchant.

17. The media of claim 15, wherein the first computing device is further operable to execute the software to recognize the third computing device as a trusted device known by the social-networking system to be associated with an account of the second party with the social-networking system, based at least in part on the information received from the third computing device.

18. The media of claim 15, wherein the first request includes a unique application identifier that identifies an application associated with the second party that is running on the second computing device, the application enabling the first party to purchase of merchandise from the second party.

19. The media of claim 15, wherein:
sending the second request for information about the second party comprises sending a challenge question to the third computing device associated with the second party; and
receiving the information about the second party comprises receiving a response to the challenge question; and
the method further comprises:
determining, by the first computing device, that the response to the challenge question is correct; and
determining, by the first computing device, the confidence score indicating the confidence level of the claimed identity of the second party based at least in part on the response to the challenge question.

20. The media of claim 15, wherein the information associated with the second party as received from the third computing device comprises at least one selected from the group consisting of:
an identifier of a user account associated with the social-networking system;
an identifier of the third computing device;
a current location of the third computing device;
an image of a face associated with the second party;
a recording of a voice associated with the second party;
a finger print associated with the second party; and
a signal from a Bluetooth device associated with the third computing device.

* * * * *